US 6,544,126 B2

(12) United States Patent
Sawano et al.

(10) Patent No.: US 6,544,126 B2
(45) Date of Patent: Apr. 8, 2003

(54) PORTABLE GAME MACHINE WITH DOWNLOAD CAPABILITY

(75) Inventors: Takao Sawano, Kyoto (JP); Tomohiro Kawase, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 69 days.

(21) Appl. No.: 09/841,173

(22) Filed: Apr. 25, 2001

(65) Prior Publication Data

US 2001/0039212 A1 Nov. 8, 2001

(30) Foreign Application Priority Data

Apr. 25, 2000 (JP) ........................................ 2000-123617
Mar. 12, 2001 (JP) ........................................ 2001-068032

(51) Int. Cl.$^7$ ................................................ A63F 9/22
(52) U.S. Cl. ........................................................ 463/42
(58) Field of Search .......................... 463/40, 42, 43, 463/44, 45; 364/410; 273/237

(56) References Cited

U.S. PATENT DOCUMENTS

| | | |
|---|---|---|
| 4,051,605 A | 10/1977 | Toal et al. |
| 4,564,923 A | 1/1986 | Nakano |
| 4,570,930 A | 2/1986 | Matheson |
| 4,572,509 A | 2/1986 | Sitrick |
| 4,725,977 A | 2/1988 | Izumi et al. |
| 5,007,649 A | 4/1991 | Richardson |
| 5,048,831 A | 9/1991 | Sides |
| 5,161,803 A | 11/1992 | Ohara |
| 5,184,830 A | 2/1993 | Okada et al. |
| 5,396,225 A | 3/1995 | Okada et al. |
| 5,408,408 A | 4/1995 | Marsico, Jr. |
| 5,428,528 A | 6/1995 | Takenouchi et al. |
| 5,618,045 A | 4/1997 | Kagan et al. |
| 5,785,598 A | 7/1998 | Hsu |
| 5,816,920 A | 10/1998 | Hanai |
| 5,971,855 A | 10/1999 | Ng |
| 6,081,828 A | 6/2000 | Yonemochi et al. |
| 6,220,964 B1 | 4/2001 | Miyamoto et al. |

FOREIGN PATENT DOCUMENTS

| | | |
|---|---|---|
| JP | 411226257 A | 4/1999 |
| WO | WO 95/12853 | 5/1995 |
| WO | WO 95/15801 | 6/1995 |

*Primary Examiner*—Melvin Jones
(74) *Attorney, Agent, or Firm*—Nixon & Vanderhye P.C.

(57) ABSTRACT

A portable handheld game machine includes a capability to download and execute code from a source such as another game machine. The portable game machine enters a download mode in which it is receptive to receipt of executable code downloaded from the source. The portable game machine stores the executable code in an internal random access memory, and executes the code out of the memory. Successive downloads can be used to download an application that is larger than the internal memory capacity of the portable game machine. The source may issue a reset command to cause the portable game machine to re-enter the download mode to receive an next successive block of code. This allows multiplayer capabilities to be achieved without requiring a separate memory cartridge to be installed in each of the portable game machines.

20 Claims, 13 Drawing Sheets

EXAMPLE GAME SYSTEM

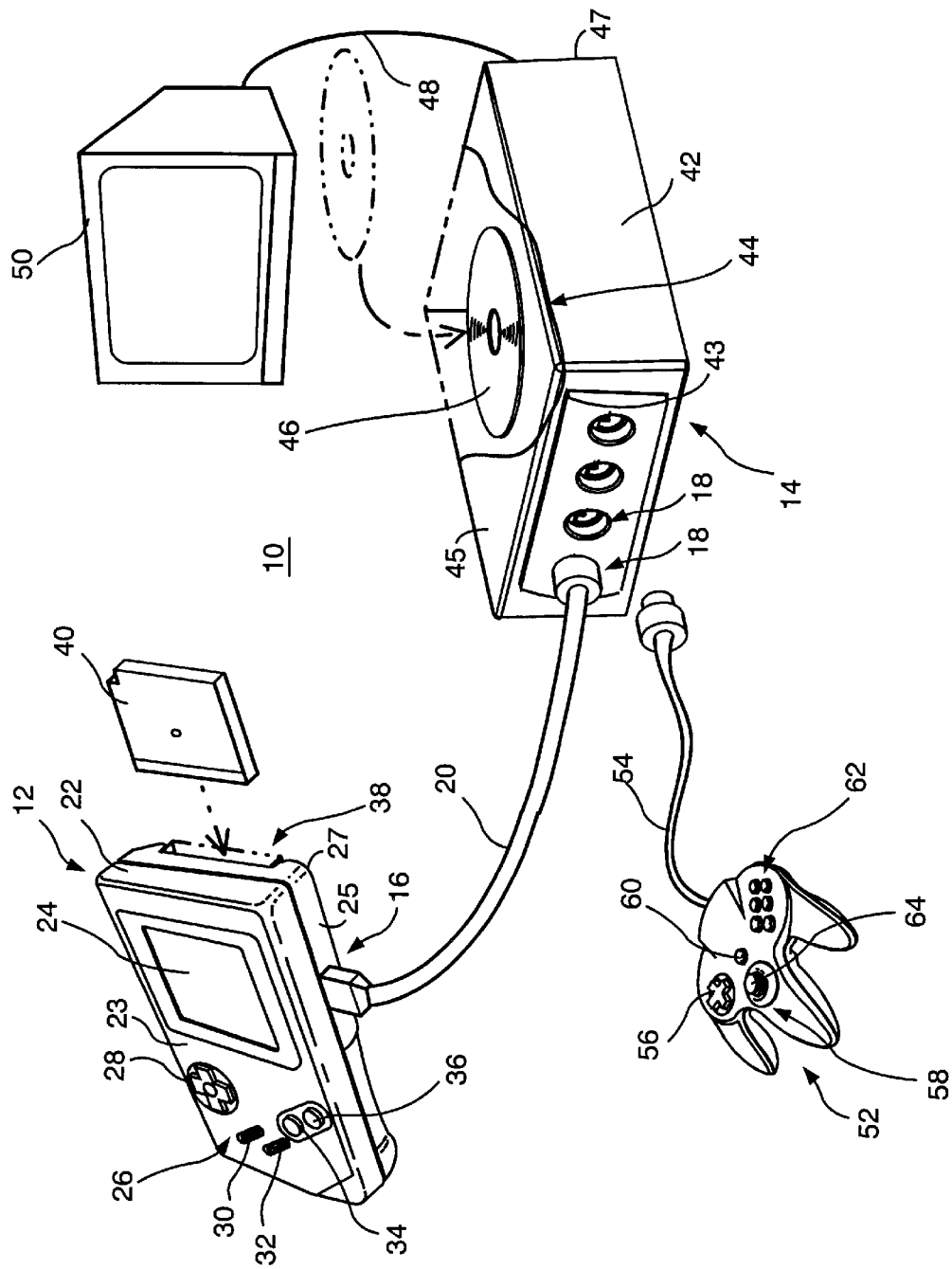
FIG. 1 EXAMPLE GAME SYSTEM

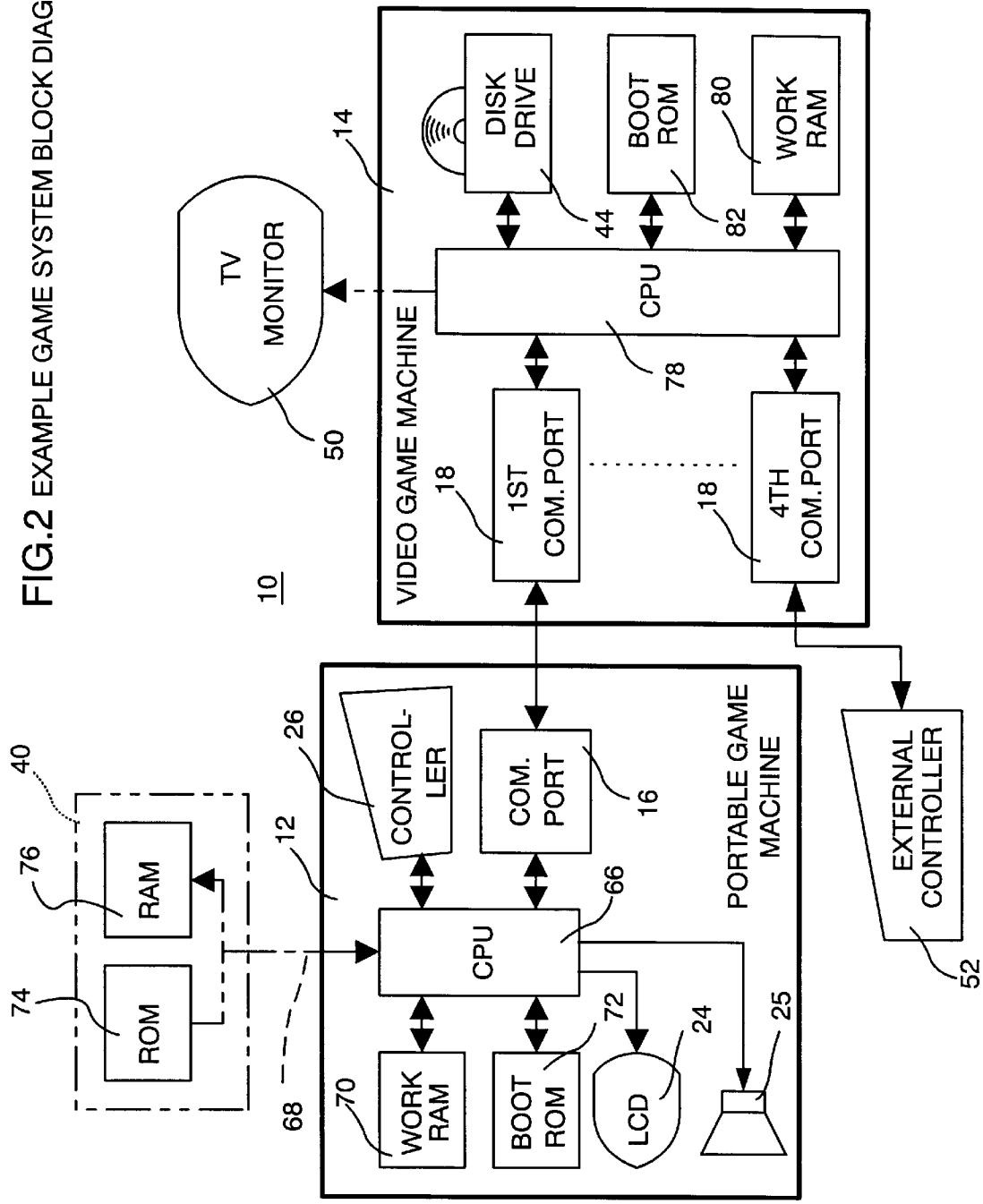
FIG.2 EXAMPLE GAME SYSTEM BLOCK DIAGRAM

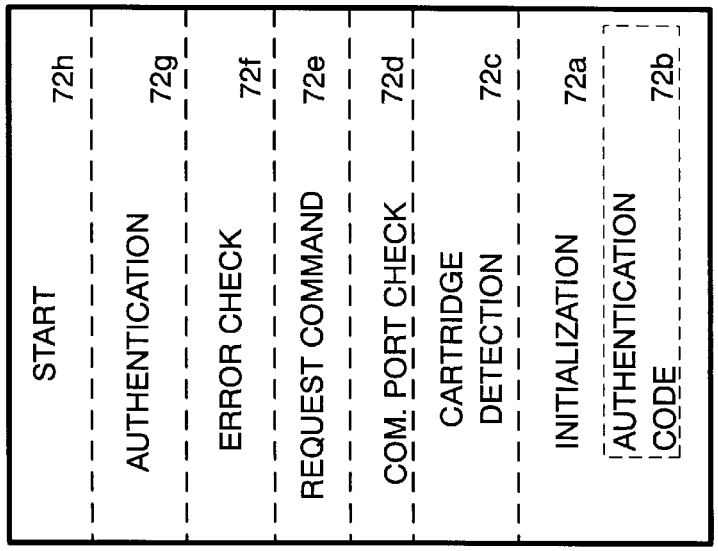

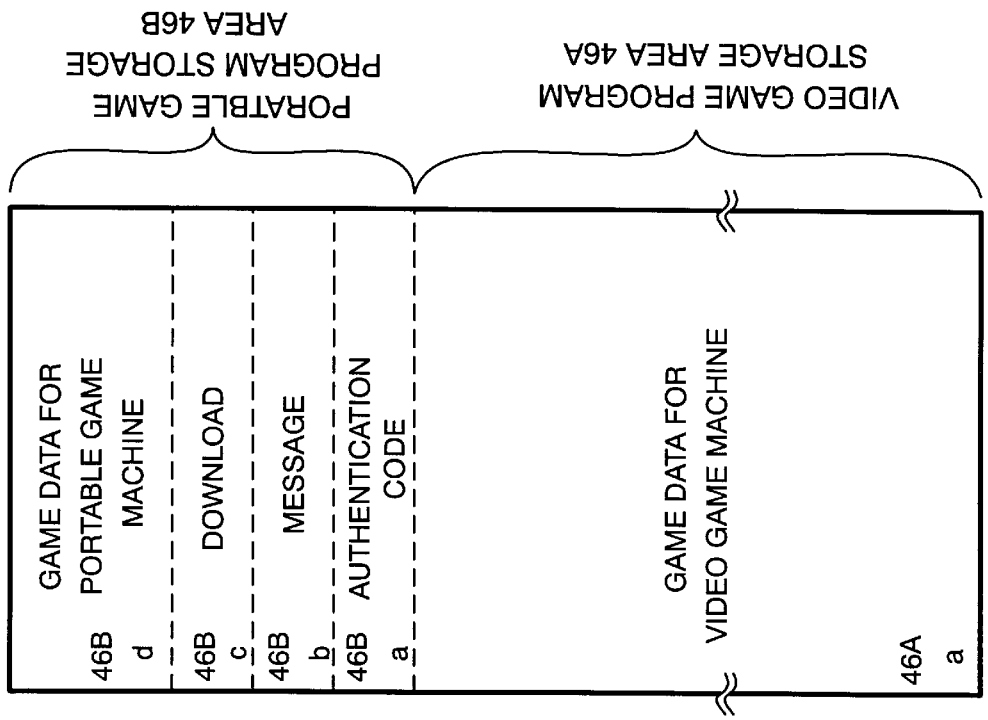
FIG.4B  EXAMPLE DVD-ROM 46 OF VIDEO GAME MACHINE 14
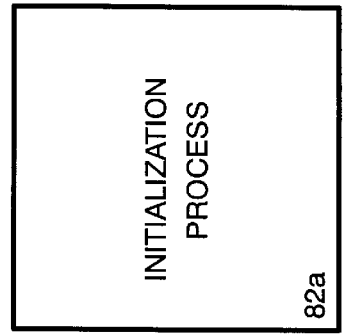
FIG.4A  EXAMPLE BOOT ROM 82 OF VIDEO GAME MACHINE 14

PROGRAM DATA LOADED INTO WORK RAM

EXAMPLE PORTABLE GAME MACHINE MAIN ROUTINE

FIG. 9 MULTIPLAYER EMBODIMENT

LINKED PORTABLE GAME MACHINES

EXAMPLE MEMORY MAPS OF LINKED PORTABLE GAME UNITS

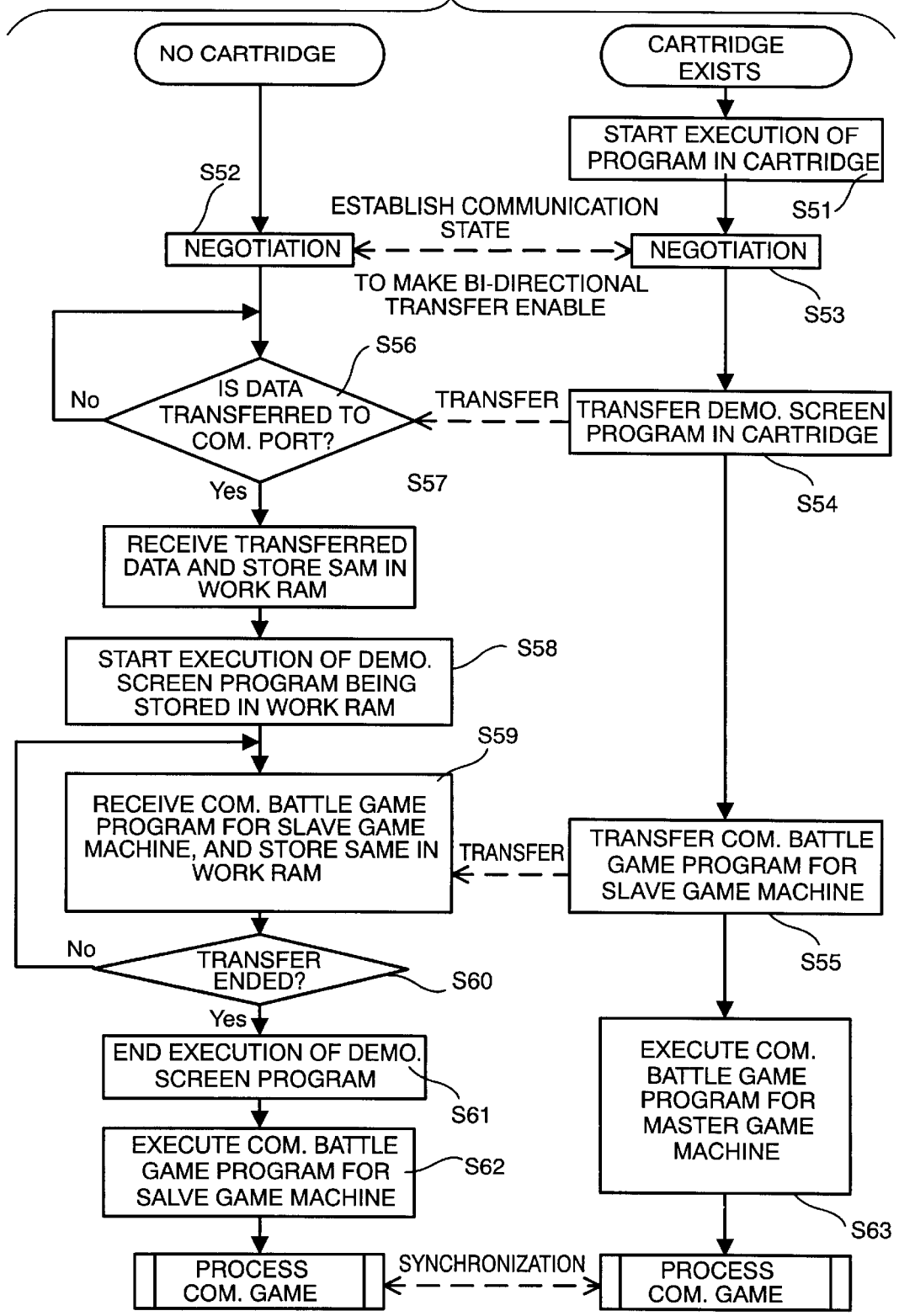

PORTABLE GAME MACHINE WITH DOWNLOAD CAPABILITY

CROSS-REFERENCES TO RELATED APPLICATIONS

"NOT APPLICABLE"

STATEMENT REGARDING FEDERALLY SPONSORED RESEARCH OR DEVELOPMENT

"NOT APPLICABLE"

FIELD OF THE INVENTION

This invention relates to game systems and portable game machines. More particularly, the invention relates to a game system including a portable game machine and another game machine, wherein executable code can be downloaded from the other game machine into the portable game machine for execution.

BACKGROUND AND SUMMARY OF THE INVENTION

There is a well-known cartridge-based portable hand-held game machine made by Nintendo known as "GAMEBOY" (product name). The GAMEBOY game machine has a boot ROM storing a boot program. The boot program is a program for initializing the portable game machine (e.g., processing involving writing zeros to memory cells and registers) and starting, after initialization, to execute a game program provided in an interchangeable ROM-based memory cartridge. The CPU of the portable game machine first executes the boot program upon turning on the unit's power. After the boot program related initialization processing, the CPU processes a game program by executing it out of the cartridge.

Nintendo's GAME BOY portable game machine has a communication port to communicate with other game machines (e.g., other GAME BOYs) or communication systems. The communication port is utilized to get game data and the like in the course of the GAME BOY's internal CPU executing a cartridge game program out of the memory cartridge.

In the conventional portable game machines, there are advantages of exchanging game data and playing network games owing to their capabilities of acquiring game data and programs from other game machines.

However, in the past, the GAME BOY communication port cannot be utilized without inserting a cartridge in the portable game machine. There exists a problem that each portable game machine needs a cartridge to participate in the game play. Thus, a cartridge for each of several portable game machines may be needed for communicating data between the portable game machines through communication ports. For playing a network game over a plurality of portable game machines, there is a need to provide, for each portable game machine, a cartridge installed with an appropriate network-game program. While this may increase the sales of game cartridges, it may be difficult to find a number of friends all having the appropriate game cartridge to play a desired multiplayer game It would be possible for an auxiliary program such as communication software to be previously stored and resident within the portable game machine housing (e.g., as part of the internal "boot ROM") in order to avoid the necessity of providing a cartridge for each portable game machine. In such a case, however, there is a need to increase the storage capacity of the portable game machine to make the capacity large enough to store the auxiliary program. This increases the manufacturing cost of making the portable game machine. Also, should an auxiliary program be stored in advance on the portable game machine, the portable game machine may not be able to compatible with different type game machines utilizing communication ports be newly developed. There may arise a problem that communications could be made impossible or incompatible between the portable game machines storing different versions of auxiliary program when the auxiliary program version is improved (e.g., due to bug fixes or functional extensions). Once a large installed user base of such portable game machines existed, it might be difficult from a practical, commercial standpoint to release new portable game machine versions having new communications ports and/or protocols that are incompatible with the prior versions.

SUMMARY OF THE INVENTION

The present invention provides a novel game system and portable game machine that overcomes these problems.

The invention also provides a game system and portable game machine which is capable of communicating data by utilizing a communication port without a cartridge received by the portable game machine.

Briefly, an illustrative embodiment provides a portable game machine that can be placed into a "download mode" when no game cartridge is inserted into the portable game machine. When operating in the "download mode", the portable game machine is capable of receiving executable code written to it by a data source (e.g., another portable game machine, a home video game machine, a personal computer, a network, etc.) The portable game machine writes the received executable code into an internal working random access memory and then proceeds to execute the code. In one example arrangement, this download capability permits multiple players to play a common video game on multiple video game units using only a single cartridge or other storage media.

In more detail, a game system according to an embodiment of the present invention communicatably connects a communications link between a portable game machine and another game machine. The portable game machine includes readable/writable storage capable of electrically reading/writing information. In response to turning on power, the portable game machine starts execution of a program stored in an information storage medium when the information storage medium is loaded into the receiving portion of the portable game machine. The portable game machine requests the other game machine to transfer a program to it when an information storage medium is not loaded in the receiving portion but communication is possible to the other game machine over a communications link.

The other game machine in this embodiment may execute a program from its own information storage medium removably coupled thereto. The other game machine reads the program out of its information medium and transfers same to the portable game machine in response to a program transfer request from the portable game machine. The portable game machine writes the program transferred from the other game machine into its readable/writable storage in response to the transfer request, and executes the second program written in the readable/writable storage.

The other game machine's information storage medium can further store a first game program for the portable game machine to execute. The program transferred to the portable game machine for execution may include a download program to be executed by the portable game machine to thereby download the game program to the portable game machine.

Where the game program stored in the other video game machine's information storage medium has a capacity greater than the storage capacity of the readable/writable storage, the download program downloads the game program in blocks or modules that are smaller than the storage capacity of the readable/writable storage.

A game system according to an example embodiment of the present invention is structured by communicatably connecting at least one portable game machine with another game machine. The portable game machine comprises a first receiver removably receiving an information storage medium storing a program to be executed on a portable game machine. The portable game machine further comprises a first communication port communicatably connecting to the other game machine. A program store stores a startup program to be executed when a startup event occurs such as when power is turned on. A readable/writable store readably/writably stores an auxiliary program transferred from the other game machine. A first processor executes the startup program stored in the program store in response to the event. The first processor executes a program provided by the information storing means according to the startup program when the information storage medium is received by the first receiver, and forwards a transfer request command through the first communication port according to the startup program (thereby storing in the readable/writable store an auxiliary program transferred from the other game machine) and executes the auxiliary program when the information storage medium is not received by the first receiver and the other game machine is communicatably connected to the first communication port.

The other game machine in this example comprises: its own information storage medium storing at least the auxiliary program to be executed on the portable game machine, and a providing program to be executed on the other game machine in order to provide the auxiliary program to the portable game machine. A second receiver removably receives the game machine's information storage medium. A second communication port communicatably connects the portable game machine to the other game machine. A second processor executes the providing program of the information storage medium received by the receiver in response to receiving a transfer request command given from the portable game machine through the second communication port. The second processor transfers the auxiliary program to the portable game machine through the second communication port according to the providing program.

In one embodiment, the auxiliary program is processed to display a message in a predetermined language on the portable game machine.

Also, in one example, the auxiliary program is processed to provide the operational information by a player operating the portable game machine to the other game machine through the communication port.

The second information storage medium loaded on the other game machine further stores a game program to be executed on the portable game machine. The providing program may transfer the auxiliary program prior to transfer of the game program to the portable game machine.

A game system according to an example embodiment of the invention is loaded with a game information storage medium storing a game program to display a game environment on a display. In this example, a game program executed from the game information storage medium allows a player to move a character appearing in the game environment by manipulating controls, thereby playing a game. A receiver receives the game information storage medium. A communication port communicatably connects to another game machine. A startup program store stores a startup program to be executed when power is turned on. A processor executes the startup program stored in the startup program store in response to turning on power, and it starts execution of a program designated by the startup program. A readable/writable store readably/writably stores an auxiliary program transferred through the communication port. The startup program causes the processor to start execution of a game program in the game information storage medium when the game information storage medium is loaded in the receiver, and the forward to the other game machine a transfer request command requesting transfer of the auxiliary program. The transferred auxiliary program is stored in the readable/writable store and is executed.

When the power is on to the portable game machine, the CPU of the portable game machine executes the startup program. The information storage medium is detected according to the startup program. When the information storage medium is received by the receiving portion, the CPU starts to execute the program it contains according to the startup program.

When the first information storage medium is not received by the receiving portion, it is determined according to the startup program whether or not communication is possible with another game machine through utilization of the communication port. When the first information storage medium is not loaded and communication is possible with another game machine, the other game machine is requested to transfer a second program according to the startup program.

In response to the transfer request from the portable game machine, the other game machine reads a second program out of information storage medium and transfers same to the portable game machine.

Transferred with the second program, the portable game machine writes to the readable/writable store the second program transferred from the other game machine in compliance with the transfer request according to the startup program, and starts to execute the second program written onto the readable/writable store.

According to the example embodiment of the invention, when the information storage medium is loaded in the portable game machine, the program stored on the information storage medium is first executed. Accordingly, there is substantially no delay in starting a game. On the other hand, when the information storage medium is not received by the portable game machine, a program is taken from another game machine. This accordingly allows the portable game machine to function in accordance with the program received from another game machine.

BRIEF DESCRIPTION OF THE DRAWINGS

The above described objects and other objects, features, aspects and advantages provided by the present invention will become more apparent from the following detailed description of the present invention when taken in conjunction with the accompanying drawings, of which:

FIG. 1 is an illustrative view showing an example embodiment provided by the present invention;

FIG. 2 is an example block diagram showing the FIG. 1 embodiment;

FIG. 3(A) is an example memory map showing a boot ROM of a portable game machine, FIG. 3(B) is an example memory map showing a work RAM of a portable game machine, FIG. 3(C) is an example memory map showing a ROM of a cartridge or other non-volatile storage medium;

FIG. 4(A) is an example memory map showing a boot ROM of a video game machine,

FIG. 4(B) is an example memory map showing a DVD-ROM or other non-volatile storage medium;

FIGS. 12A and 12B together are a flowchart showing example operations of the "master" portable game machine and "slave" portable game machine in the FIG. 10 embodiment.

DETAILED DESCRIPTION OF PRESENTLY PREFERRED EXAMPLE EMBODIMENTS

Figure 5:
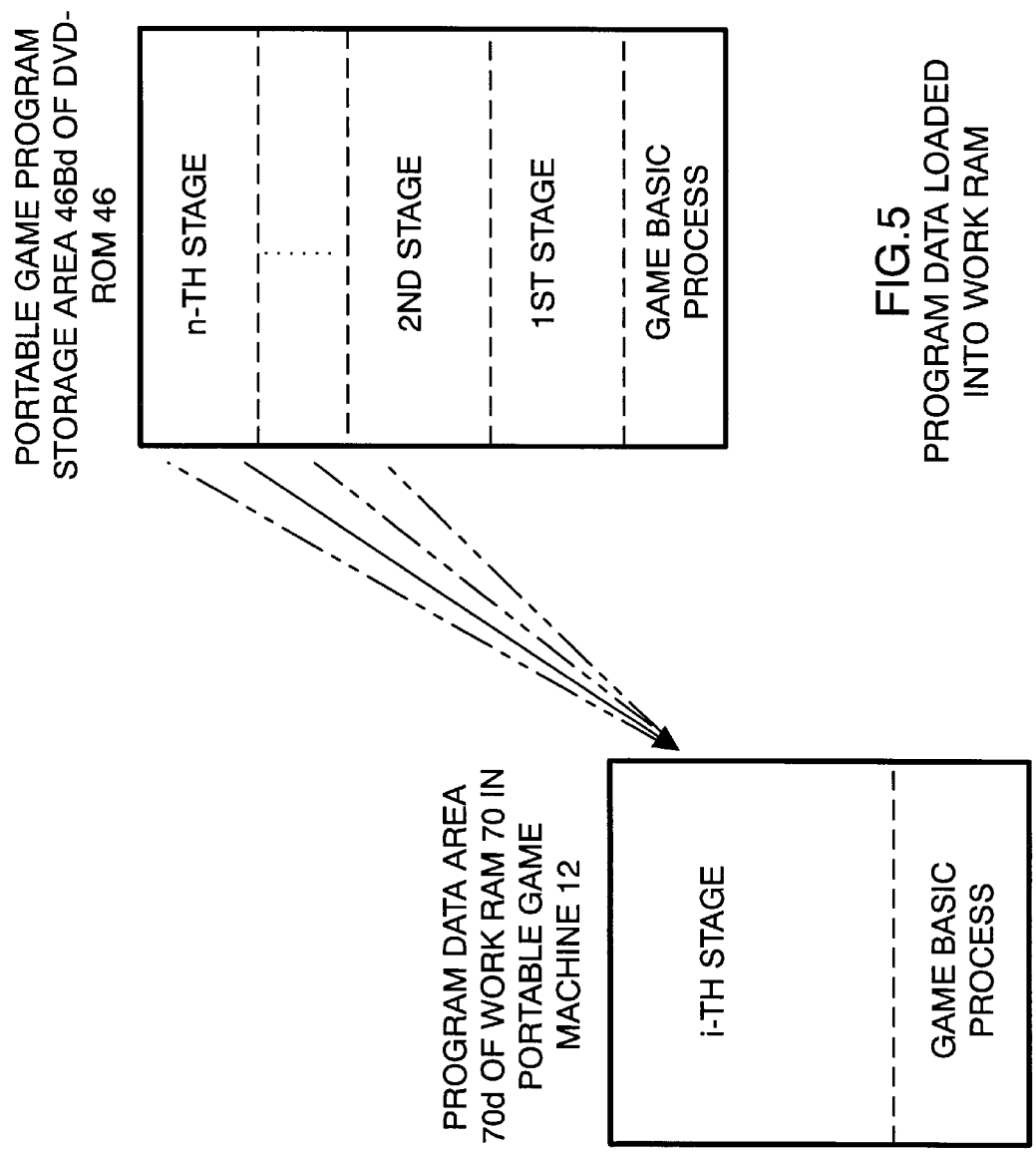
FIG. 5 is an illustrative view showing example program data of the DVD-ROM divided and transferred to the work RAM of the portable game machine.

FIG. 1 shows a game system 10 of an embodiment provided by the present invention. Game system 10 includes a portable game machine 12 and a home video game machine 14. The portable game machine 12 may be, for example, a Nintendo GAME BOY or GAME BOY ADVANCE handheld portable video game system, and the home video game system 14 may be a NINTENDO 64 or GAME CUBE 3D video game system.

In the system 10 shown, the portable handheld unit 12 and home video game unit 14 are linked. Connection is provided through a communication cable between a communication port 16 on a portable game machine 12 and a communication port 18 on a video game machine 14. Other connection means (e.g., RF, infrared, other wireless, etc.) are also possible.

Example Portable Game Machine 12

The portable game machine 12 in this example has a game-machine main body housing 22 sized to be held by the hand. For example, housing 22 can be in a rectangular form with its larger dimensions vertically or horizontally. The housing 22 has an LCD (Liquid Crystal Display) 24 constituting a display disposed on an upper portion of a first surface 23 thereof. In use, the LCD 24 displays a game space (background environment) and game characters existing in the game environment, together with required messages.

A serial communication port 16, as mentioned before, is provided in a side surface 25 of the main body. A user-manipulable controller interface 26 is arranged in a lower portion on the front surface 23 of the housing 22. The example controller interface 26, in this embodiment, includes five operation keys 28, 30, 32, 34 and 36. These operation keys 28–36 are to be manipulated, typically, by the thumbs or other digits of a game player who is holding the housing 22.

In the example shown, the operation key 28 is a cross key (switch) having a function of a digital joystick. By pressing one of four depressing points, for example, it is possible to designate a moving direction of a game character displayed on the LCD 24, move a cursor, etc. The operation key 30 in the example shown acts as a select key and may comprise a push switch. Key 30 is generally utilized in selecting a game mode, for example. The operation key 32 in the example shown is a start key and may comprise a push switch. Key 32 is generally utilized to provide an instruction for starting a game. The operation key 34 in the example shown is an A button key and may comprise a push switch. Key 34 is generally utilized to control the motion of a game character displayed on the LCD 24, e.g., hit, throw, grab, ride and so on. The operation key 36 in the example shown is a B button key and may comprise a push switch. Generally key 36 is utilized to change the game mode as selected by the select key 30 or to cancel the action as determined by the A button key 34. See for example U.S. Pat. No. 5,184,830 (incorporated herein by reference).

In the example portable game machine 12, an insertion aperture 38 is formed in an upper end of a backside 27 of the main body 22. In use, the insertion aperture 38 is used to insert a game memory cartridge 40 as a first information storage medium. Different games can be played on portable machine 12 by inserting different cartridges 40 storing the different game. Although not shown, connectors are provided respectively in a deep portion of the insertion aperture 38 and at a mating forward interface of the game cartridge 40 with respect to an insertion direction thereof. When the cartridge 40 is inserted in the insertion aperture 38, these two connectors are put into electrical contact with each other. This enables the CPU (FIG. 2) of the portable game machine 20 to access the cartridge 40 and read out and play the game. Different types of storage media could be used as well. Generally, the games played by portable unit 22 are 2D games, but some 3D-capabilities are also possible depending on the software being used.

Example Video Game Machine 14

The example video game machine 14 shown in FIG. 1 includes a flat, rectangular or cubic housing 42 and is coupled to an external display 50 such as a home television set, computer display or the like. In the example embodiment, video game machine 14 is generally larger than portable unit 12 (e.g., machine 14 may be non-portable in one embodiment and designed primarily to play games in a stationary way in the game player's living room or den connected to an external home color television set 50 as a display). Of course, machine 14 could be any size in other embodiments and use any type of display (integral or external). In the example shown, video game machine 14 may provide more capabilities than portable unit 12 (e.g., it may be a 3D video game play system with advanced 3D graphics and high-fidelity digital sound), but other arrangements are possible. In the example shown, video game machine housing 42 has a serial communication port 18, as mentioned before, arranged in a front surface 43 of the housing 42. In this embodiment, four communication ports 18 are provided for four handheld controllers 52.

In the example shown, video game machine housing 42 has an optical disk drive 44 provided on a top surface 45 thereof. A DVD-ROM 46, as a second information storage medium in this embodiment, is placed on or in the disk drive 44. In the example embodiment, the DVD-ROM 46 stores a program that the video game machine can execute, and also stores a second program for execution by one or more portable game machines 12. In the illustrative embodiment, the video game machine 14 may itself be unable to execute the second program (e.g., because it is written for a different processor), but rather, treats this second program as data to download into the portable game machine 12 for execution.

An AV (Audio-Video) terminal, not shown, is provided in a rear surface 47 of the housing 42 in the example shown. The AV terminal is connected to an AV terminal of a TV monitor 50 through a cable 48. It is noted that the AV terminal may, in addition to delivering video signals and audio signals, transmit modulated signal versions of them.

Although the communication port 18 provided in the front surface of the housing 42 is connected with a communication cable 20 in the example shown as mentioned before, this communication port 18 can also or alternatively be connected with a controller cable 54 extended from an external handheld game controller 52. The external controller 52 for the video game machine 14, in this embodiment, includes a cross key 56, an analog joystick 58, a start key 60 and a push button key group 62 and/or other user-manipulable controls.

The cross key 56 and the start key 60, respectively, have the structure and function similar to those of the cross key 28 and the start key 32 of the portable game machine 12. The analog joystick 58 in the example shown includes an operation lever 64 that is spring-loaded to stand upright during release but can be inclined in a direction when an external force is applied by the finger. By inclining this operation lever 64 in an arbitrary direction, designate an arbitrary direction anywhere in a range of 360 degrees. The analog joystick 58 is, for example, utilized to move a game character or a cursor. The push button key group 62, in this embodiment, includes four push button keys to point directions of up, down, left and right, and two keys corresponding to the A button key 34 and B button key 36 on the portable game machine 12. Other control configurations are possible.

Example Electrical Block Diagram

An example electrical configuration of the FIG. 1 embodiment is shown in FIG. 2. The portable game machine 12 has a CPU 66 (including a 2D graphical engine). The CPU 66 administers overall control for the portable game machine 12. For example, the CPU 66 is coupled with the communication port 16, LCD 24 and controller 26, and further with a cartridge 40 through the connector 68. The portable game machine 12 is also provided with a work RAM 70 formed, e.g., by an SRAM or the like and a boot ROM 72 formed, e.g., by a mask ROM. In the example shown, CPU 66 can read from Root TOM 72 and read from and write to work RAM 70. The work RAM 70 is utilized as a working area when the CPU 66 executes a program. The boot ROM 72 stores a predetermined boot program (e.g., start up program) to initialize a portable game machine 12, i.e., the work RAM 70, registers of the CPU 66 and so on.

The game cartridge 40 in this example includes a ROM 74 (e.g., of a mask ROM) and a RAM 76 (e.g., an SRAM). The ROM 74 stores, for example, a game program or other application. RAM 76 is available for storing backup data and may be non-volatile (e.g., battery backed).

Portable game machine 12 is also provided with a speaker 25 so that a sound signal from the CPU 66 is delivered to the speaker 25. Accordingly, sound can be outputted through the speaker 25.

In the example shown, the video game machine 14 has a CPU 78 including a 3D graphics engine. The CPU 78 is coupled to the four communication ports 18, a disk drive 44 and TV monitor 50. The CPU 78 is further coupled to a work RAM 80 and a boot ROM 82.

Example memory maps of the boot ROM 72 of the portable game machine 12, the work RAM 70 of the portable game machine 12 and the ROM 74 of the cartridge 40 are respectively shown in FIG. 3(A), FIG. 3(B) and FIG. 3(C).

As shown in FIG. 3A, the example boot ROM 72 of the portable game machine 12 has a comparatively small capacity, e.g., 16 K bytes, and includes an initialize program area 72a. This initialization program area 72a stores an initialize program to initialize the work RAM 70, CPU registers and so on, as mentioned before. The illustrative initialize program area 72a includes an authentication code area 72a. The authentication code area 72b in this example stores an authentication code such as image data (dot data or pixel data) representative, e.g., of "NINTENDO". The authentication code is preferably encrypted and/or data-compressed.

The example boot ROM 72 further includes a cartridge detect program area 72c. According to the cartridge detect program on this area 72c, the CPU 66 (FIG. 2) executes a cartridge detecting operation represented in the example FIG. 7 flowchart. The communication port check program stored in the area 72d of the boot ROM 72 checks whether or not the communication cable 20 is connected to the communication port 16 of the portable game machine 12 and whether or not normal data exchange is possible through the communication port 16 (i.e., whether or not the communication port 16 is utilizable or not).

The transfer request command issuing program stored in area 72 is a program for issuing a transfer request to the CPU 78 (FIG. 2) of the video game machine 14, as hereinafter explained. The error check program provided in an error check program area 72f is, e.g., a CRC check program for executing error checking on transferred data (e.g., game data or program data).

The authentication program stored in an area 72g of the boot ROM 72 is a program for carrying out authentication by the utilization of an authentication code provided in the area 72b. The example start program in an area 72h is a program for starting the execution of a game program transferred to the work RAM 70 or a game program in the cartridge 40.

As shown in FIG. 3B, the work RAM 70 of the portable game machine 12 includes an authentication code area 70a, a message area 70b, a download area 70c and a game data processing area 70d. In the illustrative authentication code area 70a is stored an authentication code read out of the area 46Ba (FIG. 4(B)) of the DVD-ROM 46 upon executing the authentication program. In the illustrative message area 70b is stored message data for delivering various messages through the LCD 24 to a game player on the portable game machine 12. The illustrative download area 70c is an area to store a game program downloaded from the video game machine 14 as described later. Also, in the example embodiment, the work RAM 70 includes, though not shown, a working memory area to be utilized by the CPU 66 as required upon executing a game program transferred to the download area 70c and/or game program provided by the cartridge 40.

In the example embodiment shown in FIG. 3C, the ROM 74 of the game cartridge 40 is formed with an authentication code area 74a and program data area 74b. The authentication code area 74a stores, in advance, a predetermined authentication code for comparison with the authentication code stored in the area 70a of the work RAM 70 upon executing the authentication program of the area 72g (FIG. 3(A)). In the program data area 74b is stored program data (e.g., character data and program data, such as executable code for a video game or other application).

As shown in FIG. 4(A), an area 82a is provided in the illustrative boot ROM 82 of the video game machine 14. This area 82a stores, in advance, an initialize program providing an initialization process.

In the example shown, the DVD-ROM 46 shown in FIG. 4(B) has two general storage areas 46A and 46B. The area 46A in this example is an area for storage of a program for the video game machine 14 while the area 46B is an area for storage of a program for the portable game machine 12. The DVD-ROM 46 used in the example embodiment has a large storage capacity as well known. There is accordingly no particular inconvenience in forming a program storage area 46B for the portable game machine 12 because of comparatively large or sufficient storage capacity. This would be similar where using a CD-ROM in place of the DVD-ROM 46, depending upon the amount of data of a video game machine program and portable game machine program. Particular types and/or sizes of storage media are not critical so long as sufficient storage capacity is provided locally and/or remotely to store both executable codes (one for the portable machine 12, another for video game system 14).

In the example shown, the video-game-machine program storage area 46A includes a program data area 46Aa for storing therein the game data or game program data (including character data) for the video game machine 14.

The illustrative portable-game-machine program storage area 46B includes an authentication code area 46Ba, a message area 46Bb, a download area 46Bc and a program data area 46Bd. The authentication code area 46Ba in this example stores an authentication code (e.g., image data representative of the trademark "NINTENDO") for download onto the area 70a in the work RAM 70 of the portable game machine 12. This authentication code is preferably encrypted and/or data-compressed in the illustrative embodiment.

The illustrative message area 46Bb stores the message data for download onto the area 70b in the work RAM 70 of the portable game machine 12. The illustrative download area 46Bc is an area for storing a download program. For example, a second program or auxiliary program can be downloaded as a game program for the area 46Bd onto the area 70c into the work RAM 70 of the portable game machine 12 for execution. The download program in this example is a program for executing various processes, such as processes for detecting a communication cable 20, detecting communication abnormality, transferring data, encrypting, error processing, authentication processing, etc. The area 46Bd stores a program data for downloading to the portable game machine 12 by the download program.

Downloading Successive Executable Modules or Blocks in Staged Fashion

As shown in FIG. 5, where a game or other application for the portable game machine 12 includes a plurality (n) of stages, the area 46Bd of the DVD-ROM 46 stores, as shown in FIG. 5, first stage data, second stage data, . . . , n-th stage data together with the game basic processing program data. In this example, the data area 70d of the portable-game-machine work RAM 70 stores game basic processing program data and i-staged data required as necessary. The game basic processing program executes the game program on the portable game machine 12, and includes an auxiliary program or the like to acquire the data or state of a controller 26.

Where the storage capacity of the area 46b (FIG. 4) in the DVD-ROM 46 as a second information storage medium is greater than the storage capacity of the work RAM 70 (readable/writable storage means) of the portable game machine 12 (i.e., when the amount of data to be downloaded from the DVD-ROM 46 to the portable game machine 12 exceeds the storage capacity of the work RAM 70, e.g., 256 K bytes), the download program allows for download per divided data section (module). Such staged downloads allow a larger program to be executed by the portable game machine 12 than can reside therein all at one time In such a case, the game basic processing program is first downloaded to become resident. It is satisfactory for each of staged data to be downloaded when required, i.e., in a time with deviation or on an as-needed demand basis. Where the area 70d of the work RAM 70 is overwritten each time a download occurs, there is a desire to process the data so as not to erase the game basic processing program (so as not to destroy the current state of game play) or again downloading a game basic processing program upon downloading each staged module (to avoid additional overhead involved in repeatedly downloading the same code over and over again). Additional downloading details are set forth below in connection with the illustrative "Reset" and "Boot" command descriptions.

Where the amount of data to be downloaded is less than the storage capacity of the work RAM 70 (e.g., 256 K bytes), it is satisfactory to download at one time all the program data including game basic processing program.

Example Overall Operation

Figure 6:
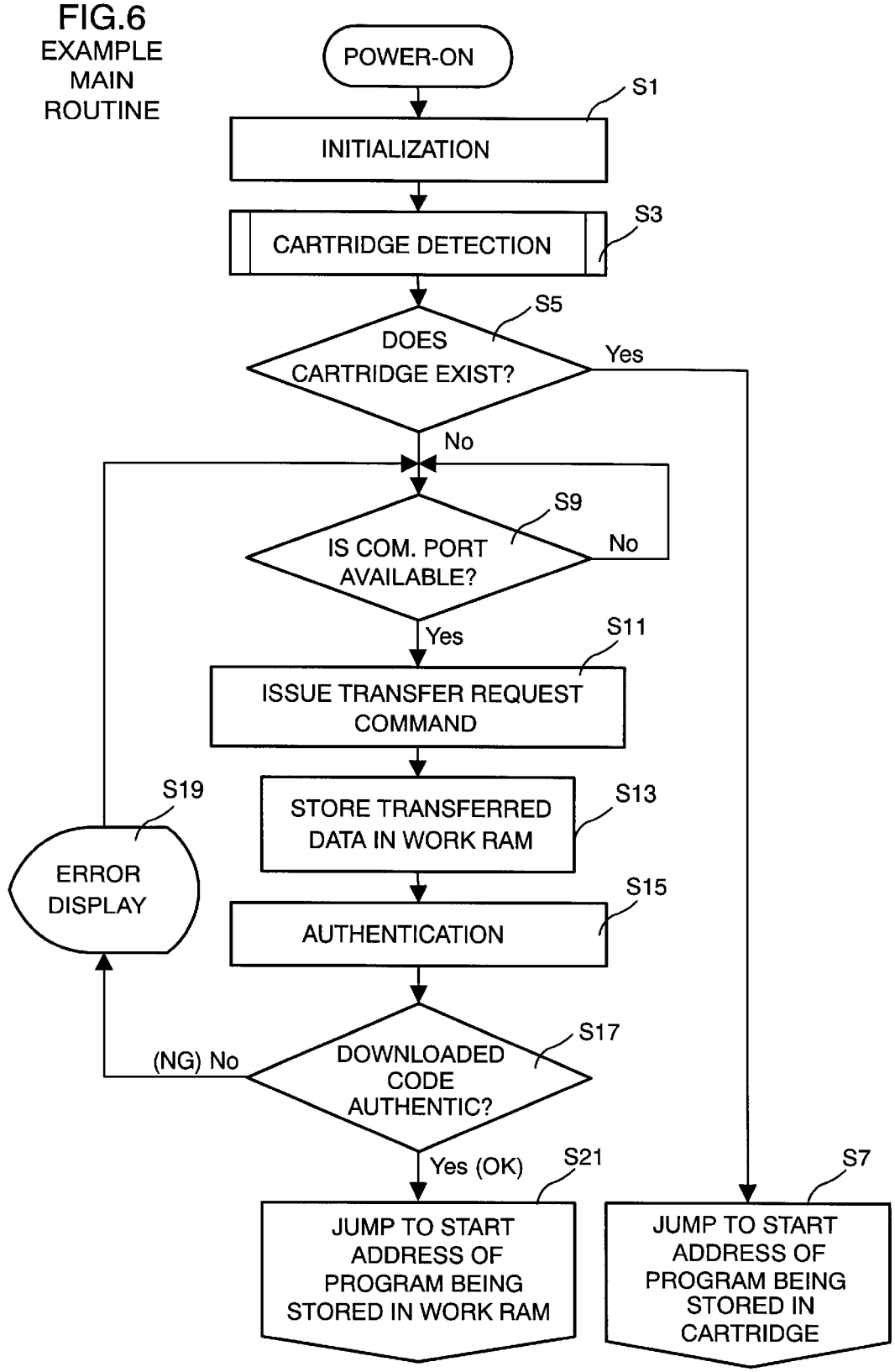
FIG. 6 is a flowchart showing example overall operation of the embodiment.

In the game system 10 of FIG. 1, when playing a game on the portable game machine 12, as a first example step S1 of FIG. 6, the CPU 66 (FIG. 2) of the portable game machine 12 executes a required initialize process such as memory clear, according to the initialize process stored in the area 72a of the boot ROM 72.

Next, in step S3, a cartridge detecting program stored in the area 72c of the boot ROM 72 is executed. An example cartridge detecting program is shown in FIG. 7.

Figure 7:
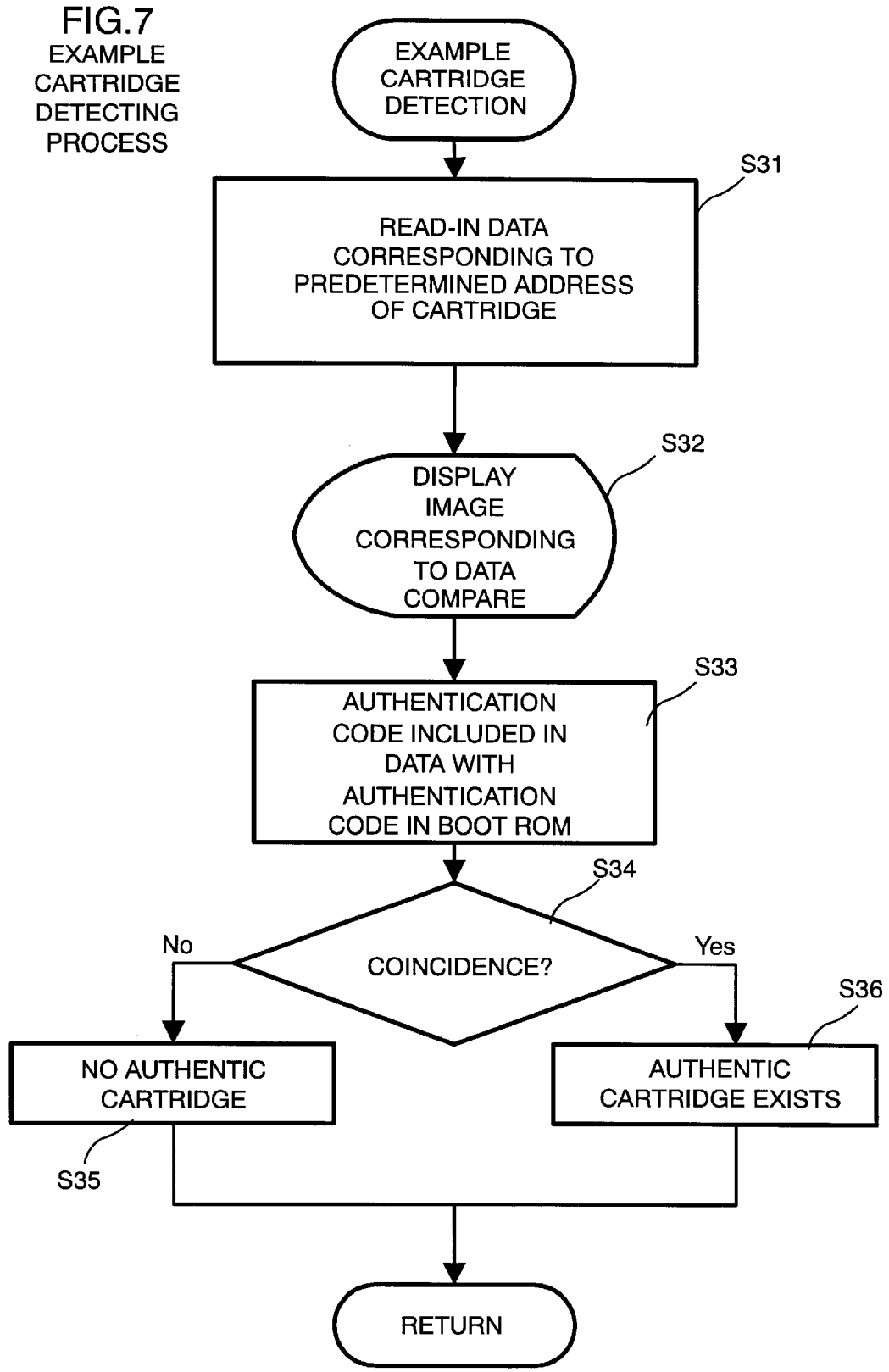
FIG. 7 is a flowchart showing an example cartridge detecting process.

In the first step S31 of FIG. 7, the CPU 66 outputs an address corresponding to the area 76a where the authentication code is stored in the cartridge 40, e.g., a header or other address, onto an address bus (not shown) and reads in the data on a data bus (not shown). If the cartridge 40 is loaded, the data to be read in at that time will be an authentication code (e.g., dot matrix data for displaying the trademark "NINTENDO"). If the cartridge 40 is not loaded, no data is read in at that time.

Then, in the next step S32, an image corresponding to the data read in the step S31 is displayed on the LCD 24 (FIG. 1). When an authentication code is read in the step S31, the text of the authentication code (trademark "NINTENDO") is displayed on display 24. When no data is read in the step S31, in step S32 an all-black image, as an example, is displayed in the area for displaying the authentication code characters.

In step S33, the CPU 66 compares the data read in the step S31 with the authentication code previously set in the area 72b of the boot ROM 72. In the embodiment, a check sum of the authentication code is compared. If the cartridge 40 is not inserted, no data is read and accordingly "NO" is determined in step S34. Consequently, in step S35 a flag of "No cartridge" ("0") is sent back to the step S5 of FIG. 6. Also, if the cartridge 40 is inserted, an authentication code is read into the CPU 66 as mentioned before. If the two authentication codes are in agreement, or bear a predetermined relationship to one another, a "YES" is determined in step S34. Accordingly, in step S36 a flag of "cartridge exists" is sent back to the step S5 of FIG. 6.

In this manner, the cartridge 40 is detected in the step S3 (see FIG. 6). Then, in FIG. 6 step S5, reference is made to the cartridge flag sent back from the FIG. 7 subroutine, to determine whether there is a cartridge or not. In this case, if the cartridge 40 is inserted, at step S7 is executed the start program in the area 72h of the boot ROM 72, and the process jumps to the start address in the game data area 74b (FIG. 3(B)) of the ROM 74 of the cartridge 40. Accordingly, in this case, a game is to be played according to a game program in the cartridge inserted in the portable game machine 12.

Where "NO" is determined in step S5, the CPU 66 in the next step S9 executes the program in the area 72c of the boot ROM 72 to check the communication port. That is, the CPU 66 checks for whether a cable 20 (FIG. 1) or other link is connected between the communication port 16 of the portable game machine 12 and the communication port 18 of the video game machine 14, and, in case the cable 20 or link is connected, whether normal data transmission and reception can be made or not. When the two conditions are satisfied, "YES" is determined in step S9. When at least one of the two conditions is not fulfilled, "NO" is determined in the step S9.

If "YES" is determined in the step S9, the CPU 66 in step S11 executes the program in the area 72e of the boot ROM 72 and issues a transfer request command to (the CPU 78) of the video game machine 14 (e.g., also called negotiation). In response, the CPU 78 of the video game machine 14 transfers all the data in the areas 46Ba, 46Bb and 46Bc of the DVD-ROM 46 shown in FIG. 4(B) and at least part of data in the area 46Bd to the work RAM of the portable game machine 12 through the cable 20. Accordingly, in step S13 the data thus transferred from the video game machine 14 is stored in the work RAM 70.

Thereafter, in step S15 an authentication process similar to that of the step S34 of FIG. 7 is executed. In this case, it is the authentication code having been transferred from the DVD-ROM 46 to the area 70a of the work RAM 70 that is compared with the authentication code provided in the area 72b of the boot ROM 72. If the two authentication codes are not in agreement as a result of the authentication process in step S15, this results in authentication NG ("No"). In such a case, the CPU 66 in step S19 provides error display, e.g., with the suspension of further operations as indicated by flickering of authentication code characters on the display.

If two authentication codes agree to result in authentication OK (resulting in determination "YES" in step S17), the CPU 66 in step S21 executes the start program in the area 72h of the boot ROM 72, jumping the process to a start address of the program data transferred to the area 70d of the work RAM 70. Accordingly, it is possible to play a game on the portable game machine 12 according to the program data transferred or downloaded from the DVD-ROM 46 onto the portable game machine 12.

Figure 8:
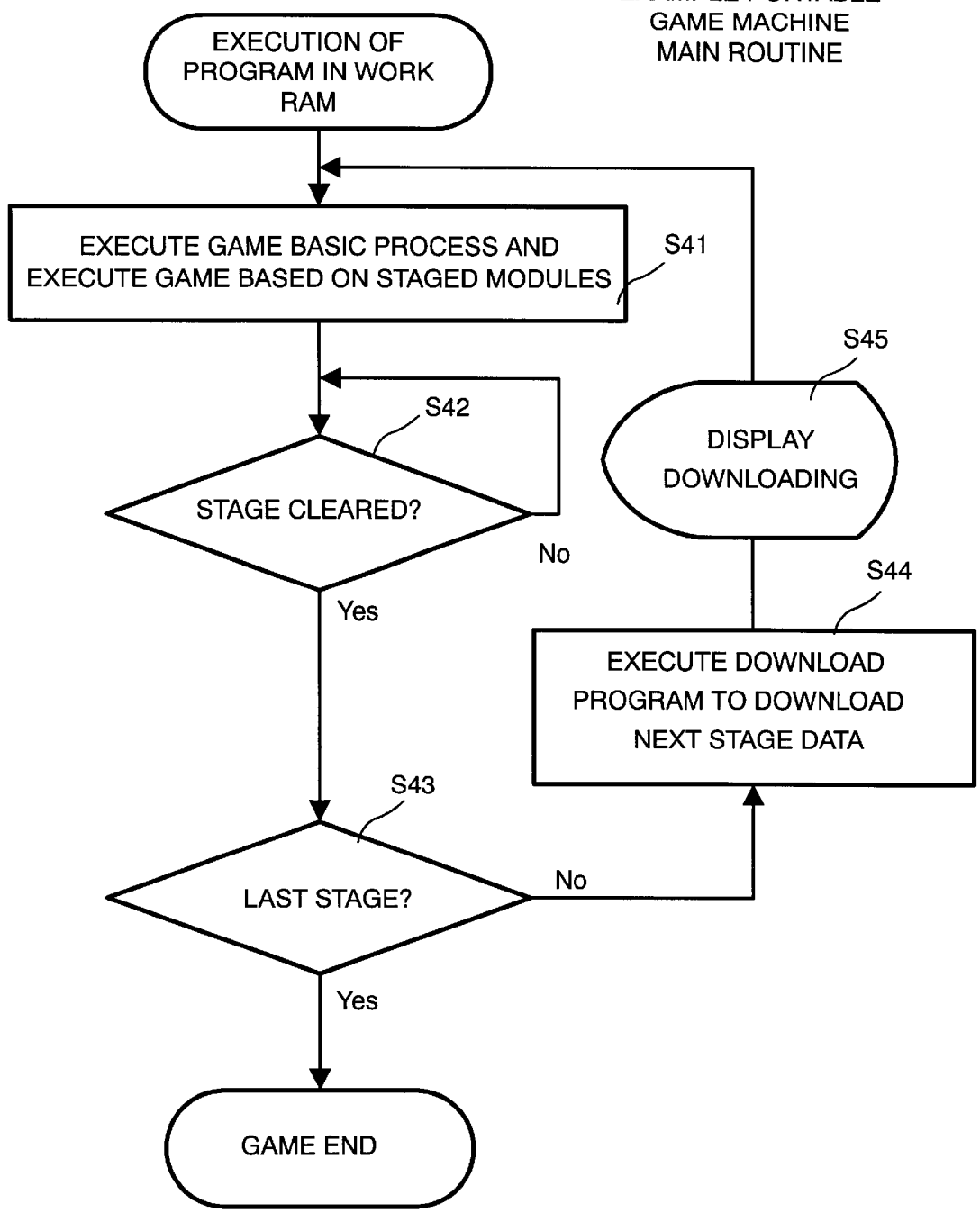
FIG. 8 is a flowchart showing an example operation to execute a game in the portable game machine according to example program data in the work RAM.

FIG. 8 shows an example portable game machine main routine in the case of executing the program within the work RAM 70, the game basic processing program shown in FIG. 5 is executed in step S41 of FIG. 8 thereby executing a game based on the staged module downloads. Then, the CPU 66 in step S42 determines whether the game stage (module) under execution could be cleared or not. If "YES" is determined in step S42, the CPU 66 in the next step S43 determines whether the cleared module in the step S42 is a final or n stage or not.

If "YES" is determined in the step S43, the game ends. However, if "NO", the CPU 66 in step S44 executes the download program transferred from the DVD-ROM 46 to the area 70c of the work RAM 70 to download the next stage module from the DVD-ROM 46. The step S44 is executed each time a stage clears until step S43 determines that the last stage has been executed (Yes" exit to decision block S43). Thus the staged modules are sequentially downloaded onto the area 70d of the work RAM 70. In this case, a message, for example, "Downloading" or "Now Loading" may be displayed, in the step S45, on the LCD 24 by utilizing the message data provided from the video game machine 14 to the message area 70b of FIG. 3(B).

In this embodiment, when the cartridge 40 is loaded in the portable game machine 12, the program stored on the cartridge 40 is executed. Therefore, there is virtually no delay in starting the game on the portable game machine 12. On the other hand, when the cartridge 40 is not loaded, because the program to be executed is being downloaded from another game machine 14 connected to the communication port 16, it is possible to provide the portable game machine 12 with a function dependent upon that program. Accordingly, it is possible to easily make changes to the program or data for downloading into the portable game machine 12. Thus, one type or model of the portable game machine can easily cope with various languages, various video game machines 14 or other variations. In this manner, it is possible to supply a required program from another game machine to the portable game machine when required through use of a small program, such as may be stored in the boot ROM, without providing each portable game machine, in advance, with a great number of programs. Where the foregoing auxiliary program is previously installed on the portable game machine, for messages in Japanese or English the portable game machine might be used only within the geographic territory. However, if the auxiliary program is sent as required from another game machine to the portable game machine as in the disclosed illustrative embodiment, the portable game machine having been sold in any country can be used by single game software sold for another game machine in the same-language territory.

The FIG. 1 embodiment also allows for playing an interactive game with both the portable game machine 12 and the video game machine 14. For example, when downloading from the video game machine 14 into the portable game machine 12, a device driver program as an example of a second or auxiliary program can take the data from operation on the controller 26 of the portable game machine 12 as input data into the video game machine 14 similarly to the above game data. The video game machine 14 can thus acquire the information on the state of the portable game machine 12's controller 26 through the cable 20 or other link. Accordingly, (the controller 26) of a portable game machine 12 can be used in place of the controller 52 of the video game machine 14. The conventional portable game machine 12 when not loaded with a cartridge will not accept a key input in the illustrative embodiment. If image data is delivered from the video game machine 14 to the portable game machine 12 through the cable 20 or other link, the LCD 24 of the portable game machine 12 can be utilized as a sub-screen for displaying game-player personal information, e.g., piece hands in a mahjongg game or one's hand in a card game. In this case, the monitor 50 is utilized as a main screen for displaying overall information.

Example Multiplayer Embodiments

Figure 9:
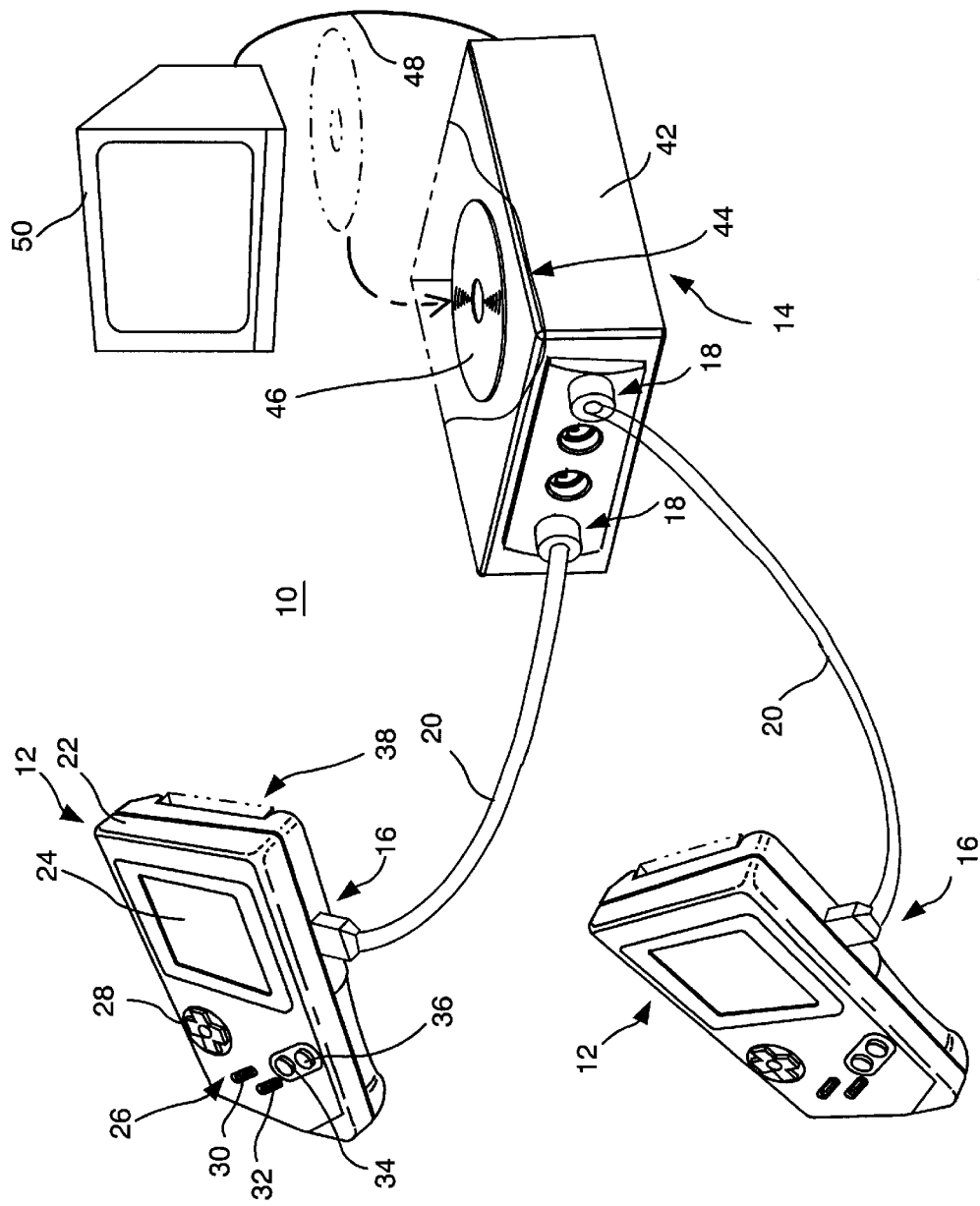
FIG. 9 is an illustrative view showing a further example embodiment of the invention wherein software is downloaded into the portable game machines (multiplayer)

Furthermore, as shown in FIG. 9, the game system 10 can be configured by communicatably connecting a plurality of (two or more) portable game machines 12 to the video game machine 14. In this embodiment, two portable game machines 12 are connected to the video game machine 14 wherein the cartridge 40 (FIG. 1) is not inserted into any of them. The both portable game machines 12 receive program data downloaded from the video game machine 14. Accordingly, it is possible in this embodiment to play a common network game on a plurality of portable game machines 12. In this case, because the portable game machines 12 can (but need not) execute the same program, the program for the portable game machines 12 can be easily unified in version. This eliminates the inconvenience in using different versions of cartridges for the respective portable game machine as encountered in the conventional.

In the above embodiment, the video game machine was shown as "another game machine" from which executable code is downloaded into the portable game machine(s) 12. However, "another game machine" in the invention may be any game machine to use an information storage medium storing an auxiliary program (authentication code, message data, download program, etc. shown in FIG. 4(B)), including various game machines, such as portable game machines, stand-alone video game machines, personal computers, network connected appliances, etc. The term "information storage medium" herein means any medium capable of physically or electronically storing information, such as CD-ROM, semiconductor ROM, semiconductor RAM, hard disks, memory cards and cartridges, and the DVD-ROM in the embodiment by way of non-limiting example.

Figure 10:
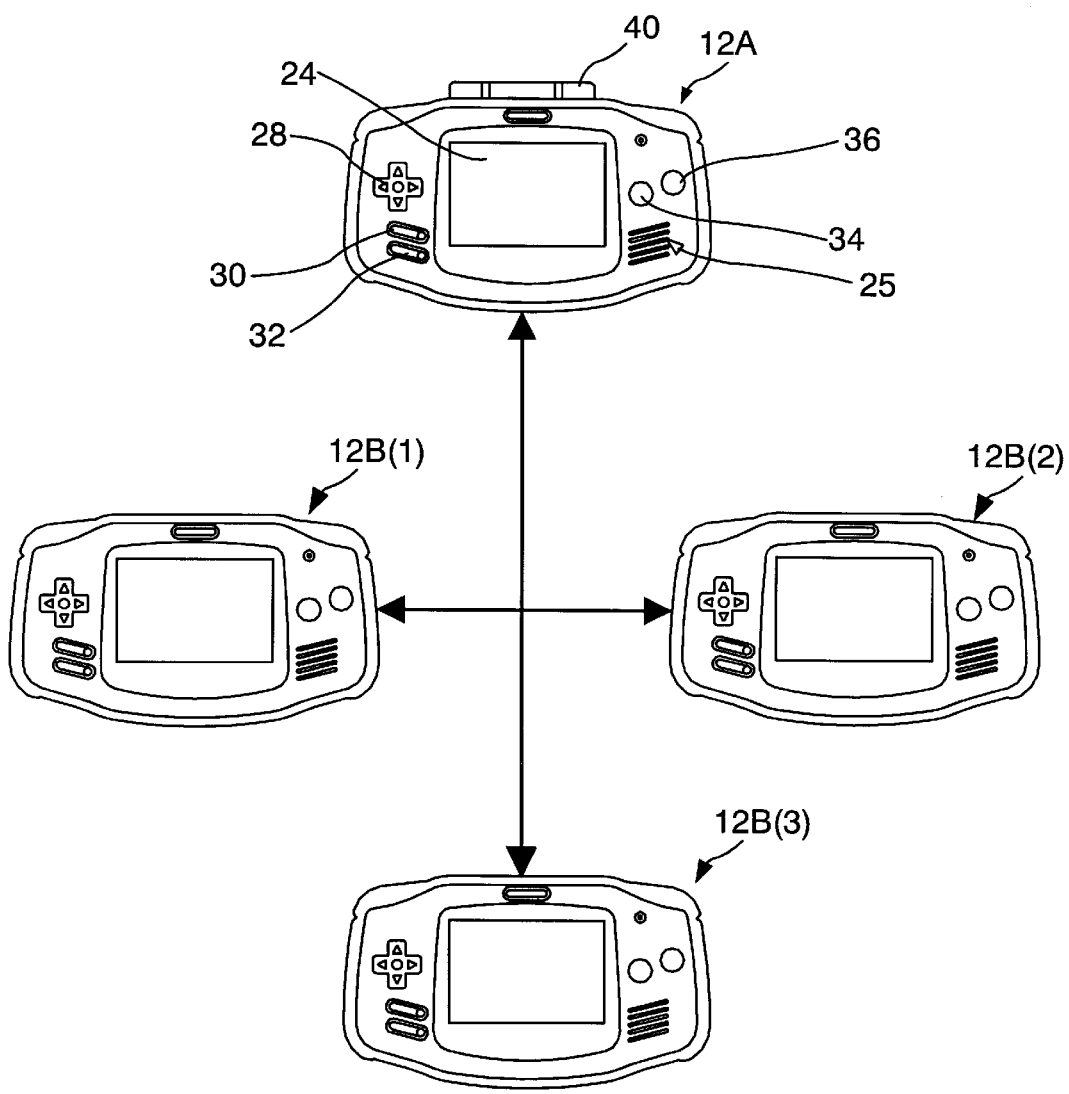
FIG. 10 is an illustrative view showing another example embodiment of the invention wherein multiple portable game machines are linked to provide multiplayer capability.

FIG. 10 shows an embodiment using a portable game machine 12 as "another game machine" for the downloading source as mentioned above. This embodiment uses, as an "information storage medium", a cartridge 40 incorporating a semiconductor memory. A portable game machine 12A loaded with the cartridge 40 is used as a "master" machine or "another game machine". Another portable game machine 12B not loaded with a cartridge 40 receives the transfer of a program from the "master" portable game machine 12A. Consequently, it is possible to play the same communication battle game programmed in the one cartridge 40 (one-cartridge play), on all the (e.g., four, in this embodiment) portable game machines 12A and 12B.

Figure 11:
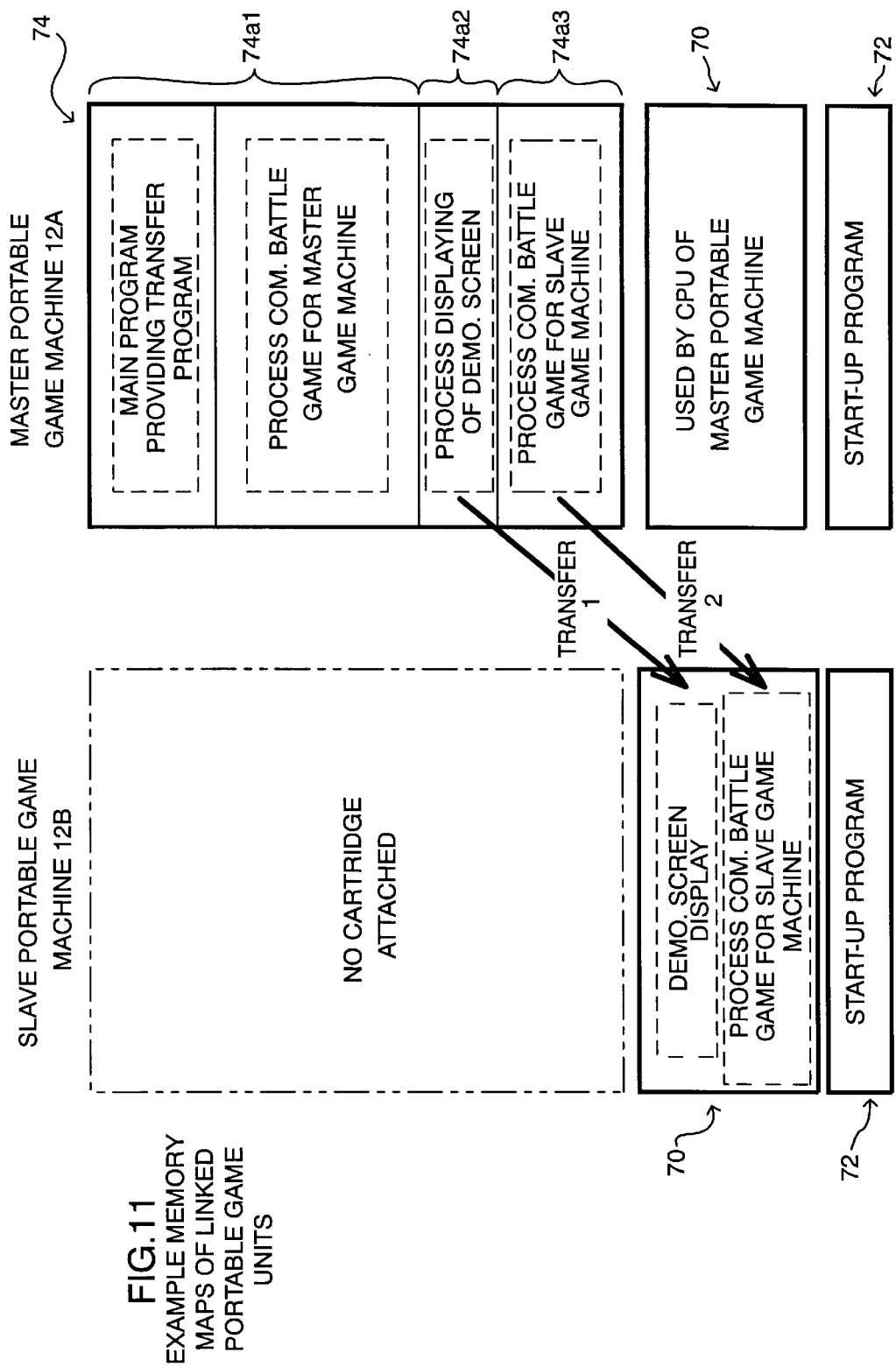
FIG. 11 is an illustrative view showing a memory map of a "master" portable game machine and "slave" portable game machine in the FIG. 10 embodiment.
Figure 13A:
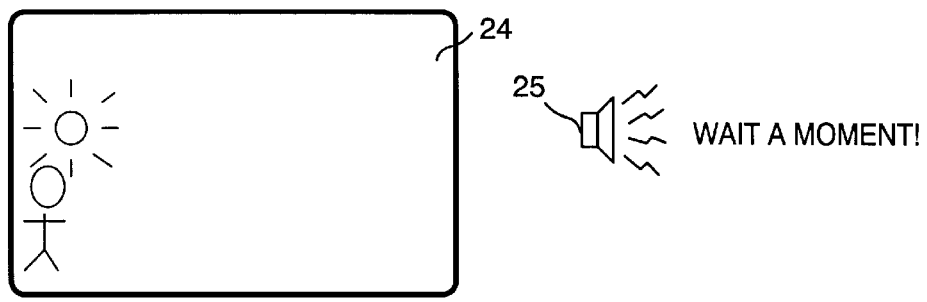
FIGS. 13A–13D are illustrative views showing one example of a demonstrative screen when a demonstrative-screen-display processing program transferred from the "master" portable game machine is executed on a "slave" portable game machine in the FIG. 10 embodiment.
Figure 13B:
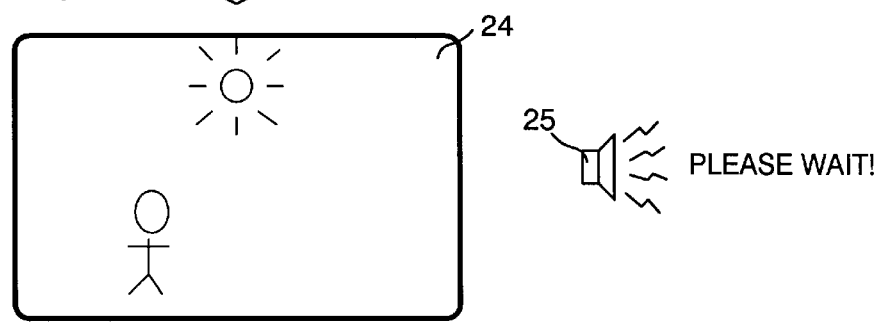
Figure 13C:
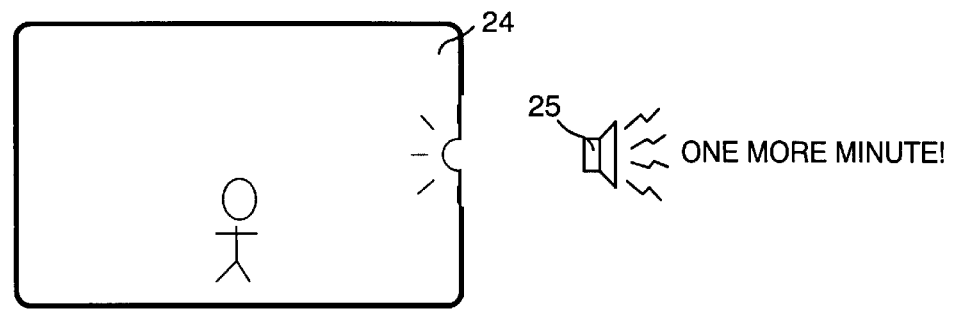
Figure 13D:
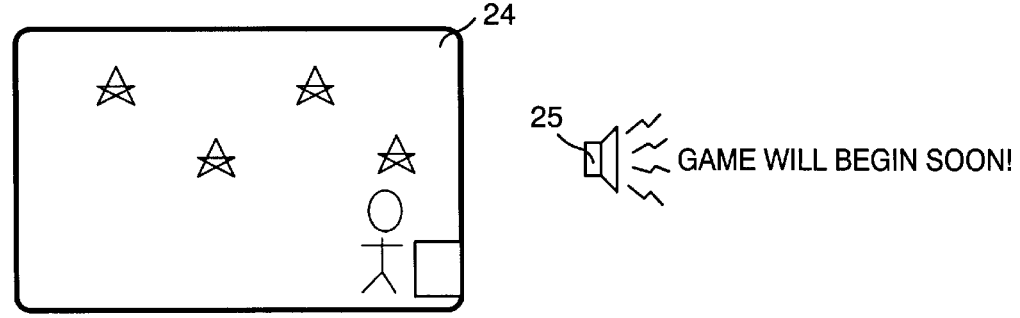

In the embodiment of FIG. 10, the cartridge 40 on the master portable game machine 12A incorporates a ROM. The ROM 74 includes, as shown in FIG. 11, three program storage areas 74$a$1, 74$a$2 and 72$a$3.

On the program storage area 74$a$1 is stored a main program and "master" communication battle game processing program. This main program includes a providing program for transferring programs or graphics data from the master portable game machine onto the "slave" portable game machine(s) 12B. The master communication battle game processing program in this example is a program to be executed by the CPU 66 of the master portable game machine 12A for processing a communication battle game.

The illustrative program storage area 74$a$2 in the ROM 74 stores an auxiliary program. In this embodiment, the auxiliary program is a demonstrative screen display processing program. The demonstrative screen display processing program is a program for executing demonstrative screen display shown in FIG. 13, as hereinafter referred. That is, in this example the demonstrative screen display processing program is a program for displaying a demonstrative screen for allowing the game player on the slave portable game machine 12B to determine a program transfer state by displayed images and/or reproduced sound until the program transfer has been completed from the "master" portable game machine 12A to the "slave" portable game machine 12B. The demonstrative screen display processing program is transferred from the master portable game machine 12A to the "slave" portable game machine 12B.

In this example, the program storage area 74$a$3 stores a "slave" communication battle game processing program to be transferred similarly to the "slave" portable game machine 12B. The "slave" communication battle game processing program is a program for processing the relevant communication battle game by the CPU 66 of the slave portable game machine 12B, similarly to the master communication battle game processing program in the above game program storage area 74$a$1.

The work RAM 70 of the master portable game machine 12A in this example is appropriately utilized by the CPU 66 (FIG. 2) of the master portable game machine 12A. The boot ROM 72 of the master portable game machine stores a startup program as shown in FIG. 3(A).

As also shown in FIG. 11, the work RAM 70 of the "slave" portable game machine 12B is utilized to store a demonstrative screen display processing program and slave communication battle game processing program to be transferred from the master portable game machine 12A. Also, the boot ROM 72 of the slave portable game machine 12B stores a startup program as shown in FIG. 3(A), similarly to the "master" portable game machine.

In the embodiment shown in FIG. 10, the startup program stored in the boot ROM 72 (FIG. 3(A)) is executed to detect a portable game machine loaded with a cartridge 40 that is to operate as a "master" portable game machine 12A. A portable game machine 12 whose cartridge is not loaded is detected to operate as a "slave" portable game machine 12B. The master portable game machine executes the operation shown in FIG. 12(B) while the slave portable game machine executes the operation shown in FIG. 12(A).

In this example, the master portable game machine 12A loaded with the cartridge 40 in the first step S51 executes the main program in the program storage area 74$a$1 of the ROM 74 incorporated therein. The slave portable game machine 12B and the master portable game machine 12A in steps S52 and S53 negotiate with each other and establish a communication state using communication port 16—thus providing a state for bidirectional data transfer. Because of reception of program and data transfer from the master portable game machine 12A as hereinafter described according to the above negotiation, the step S52 serves as a transfer request or transfer request command from the slave portable game machine 12B to the master portable game machine 12A.

In the embodiment of FIG. 10, a communication cable as shown in the FIG. 1 embodiment is connected between the respective communication ports 16 (FIG. 2) of the master portable game machine 12A and the slave portable game machine 12B. Consequently, the negotiation and data transfer between the master portable game machine 12A and the slave portable game machine 12B are made by using the communication ports 16 and a communication cable provided between them in this example illustrative arrangement.

If a communicatably state is established as a result of the negotiation, the master portable game machine 12A in step S54 transfers (transfer 1) the demonstrative screen display processing program (module) stored in the program storage area 74$a$2 (FIG. 11) of the ROM 74 to the communication port 16 of the slave portable game machine 12B, and in step S55 transfers (transfer 2) the slave communication battle game processing program (module) stored in the program storage area 74$a$3 of the ROM 74 to the communication port 16 of the slave portable game machine 12A.

After the negotiation step S52, the slave portable game machine 12B in step S56 waits for the data to be transferred to its communication port 16. If it is detected in the step S56 that the data has been transferred to the communication port 16, (the CPU of) the slave portable game machine 12B stores the data transferred to the communication port 16, i.e., the demonstrative screen display processing program, into the work RAM 70 (step S57) and, in step S58, starts the execution of the demonstrative screen display processing program stored in the work RAM 70. The demonstrative screen display processing program, for example, displays a demonstrative screen as shown in FIGS. 13A–13D.

FIGS. 13A–13D show example demonstrative screens. The demonstrative screen sequentially varies in display as shown in FIG. 13(A) to FIG. 13(D) during the period of data transfer from the "master" portable game machine 12A to the "slave" portable game machine 12B. Sound is outputted through the speaker 25 (FIG. 2, FIG. 10), as shown in FIG. 13(A) to FIG. 13(D), thereby alerting the game player on the "slave" portable game machine 12B that data is under transfer.

The slave portable game machine 12B, in step S58 of FIG. 12, starts the execution of the demonstrative screen display processing program as shown in FIG. 13, and in the succeeding step S59, stores the "slave" communication battle game processing program transferred from the master portable game machine 12A to the communication port 16 in the step S55 onto the work RAM 70 as shown in FIG. 11. If it is determined in step S60 that the transfer of the slave communication battle game processing program is completed, in step S61 the execution of the demonstrative screen display processing program on the "slave" portable game machine 12B is ended at that time point.

The "slave" portable game machine 12B in step S62 executes the "slave" communication battle game processing program. The "master" portable game machine 12A in step S63 executes the "master" communication battle game processing program. Thus, a single communication game can be played on plural portable game machines using the cartridge 40 loaded in the "master" portable game machine.

Example More Detailed Description of Download Protocol

On a more detailed level, communications between the portable game machine 12 and the video game machine 14 may be conducted based on a JOY BUS protocol—a serial communications protocol that the Nintendo 64 has used for many years to communicate with its handheld controller. Briefly, in order to initiate communications, the video game machine 14 uses a "boot" routine to upload a program (executable code) to the portable game machine 12. Then, the video game machine 14 uses additional functions (e.g., "get status", "reset", "read", "write") to communicate with the activated handheld portable game machine 12. The overall process of using the serial protocol to download a program into the portable game machine 12 and to start up the portable game machine may be called a "boot" process. As mentioned above, it is also possible to use a program installed in the portable game machine 12 (e.g., by providing such a program in a cartridge ROM) to establish communications between the portable game machine 12 and the video game machine 14.

As mentioned above, if a game cartridge is inserted in the portable game machine 12, then the portable game machine will execute a startup routine out of the cartridge. It is possible to conduct communications between the portable game machine 12 and the video game machine 14 through execution of this cartridge-based program. Thus, in the preferred embodiment, even if a cartridge is inserted into the portable game machine 12, it is still possible to perform a "boot" process to download a program from the video game machine 14 into the portable game machine 12 and execute it on the portable game machine if desired. Typically, however, such a "boot" and associated download process will occur when a cartridge is not inserted into the portable game machine 12.

When a cartridge is not inserted into the portable game machine 12 and power to the portable game machine is activated (or, in other embodiments, when a "reset" or other operation occurs), the portable game machine enters the "download mode." When the portable game machine 12 is in this mode, programs can be downloaded to the portable game machine via the portable game machine's expansion port (e.g., a six-pin connector—see OKADA et al., U.S. Ser. No. 09/722,410, entitled: "PORTABLE VIDEO GAME SYSTEM" (Atty. Dkt. 723-951)). From the standpoint of the video game machine 14, the operation is an "upload" of program data from the video game machine to the portable game machine 12. From the standpoint of the portable game machine 12, on the other hand, this operation is a "download" from the video game machine 14 into the portable game machine.

In the example illustrative embodiment, when a game cartridge is inserted into the portable game machine 12 and the "select" and "start" buttons are pressed simultaneously within the first approximately two seconds after the power is turned on, the portable game machine 12 enters the "download mode." In this example embodiment, when the portable game machine 12 enters the "download", a sound effect chimes and the "Nintendo" logo vanishes from the display. In the download mode, if data communications with the video game machine 14 do not start, it is possible to cancel the "download mode" with additional user manipulation of the button controls to perform a "normal" startup operation from an inserted game cartridge.

The following is a brief description of example functions that may be used in the "download mode." These functions include, for example:

Initialize,
GetStatus,
Reset,
Read,
Write,
Boot,
GetProcessStatus

Initialize

The Initialize function may be required for some video game machines 12 in order to initialize a message buffer used to communicate messages between the video machine 14 and the portable game machine 12. GetStatus The GetStatus command is used to get the status of the portable game machine 12. This function may include, as arguments, a designation of one of the four controller ports of the video game machine 14 as well as a pointer into the video game machine 14's memory pointing to storage status word returned by the portable game machine 12. A mask function may be used to select particular bits of the status word returned by the portable game machine 12. When the video game machine 14 issues this command to the portable game machine 12, the portable game machine returns an eight-bit value in the example embodiment indicating its status. The function fails if no portable game machine 12 is connected, if a portable game machine is connected but is in a state in which it cannot process incoming commands from the video game machine 14, or if some device other than a portable game machine 12 is connected. An asynchronous version of this (and other) commands may include a callback parameter.

Reset

In the example illustrative embodiment, the video game machine 14 can control the portable game machine 12 to reset itself by issuing a reset command. Parameters include, in the exemplary embodiment, a designation of a particular controller port and an eight-bit status field. The status field may provide a pointer for storing status values returned by the portable game machine 12. The function issues a Reset command to the portable game machine 12, and retrieves its status values. In the exemplary embodiment, the Reset does not implement a hardware reset of the portable game machine 12. However, the portable game machine 12 can treat this command like a software "reboot request" to cause the portable game machine to perform a "reboot" upon receipt of the command.

Read

In the exemplary embodiment, the Read function allows the video game machine 14 to read data from the portable game machine 12. In the illustrative embodiment, this function retrieves a certain number of bytes of data that the portable game machine 12 writes in serial format to its data port. Parameters may include a controller port designator, a destination pointer and a status field. A destination pointer may be used to indicate a location in memory for storing the data that is read from the portable game machine 12. The status field may comprise a pointer for storing a status value returned by the portable game machine 12.

Some care must be taken with respect to synchronization between the time the portable game machine writes data to its output port and the time the video game machine 12 attempts to read such data. Even if the portable game machine 12 has not yet written to its output data port, the issuance of the "Read" command by the video game machine will cause some data to be returned. A bit within the returned "Status" word from the portable game machine 12 may indicate whether or not the portable game machine has yet written data to the output data port. However, even if this status bit indicates that data has been written, there is still a chance that the portable game machine 12 will write data to the output data port while the "Read" command is in progress. This could lead to reading abnormal data. Therefore, the video game machine 14 must take some care to ensure synchronization with the timing of the portable game machine 12's writing of values to the output data port.

Write

In the example illustrative embodiment, the video game machine 14 may issue a "Write" command to write data to the portable game machine 12. Parameters may include a designation of a particular controller port, a pointer to where data to be written to the portable game machine 12 is stored in the video game machine 14's main memory, and a pointer for storing a status value to be returned by the portable game machine 12. Issuance of this command writes a predetermined number of bytes of data to the portable game machine 12's input data port. Even if there is old data remaining in the portable game machine 12's input data port that has not yet been read, that data is destroyed by the issuance of the "Write" command through overwriting by the new data. Therefore, the video game machine 14 may wish to check that there is no old data remaining (e.g., by issuing a "GetStatus" command and checking a predetermined status bit within that returned status word before issuing a "Write" command.

In the example embodiment, the status value's predetermined "Receive" bit is always returned in a set state, so it is not possible to determine from the status value returned immediately after the "Write" process has been performed whether old data remained in the input data port of the portable game machine 12.

"Boot"

The "Boot" function in the example embodiment loads an executable program into the portable game machine 12 and controls the portable game machine to begin executing the uploaded program. Parameters include the following in the exemplary embodiment:

controller port designation, palette color, palette speed, program ramp, length, status.

In the exemplary illustrative embodiment, the controller port designator indicates one of the controller ports of the video game machine 14. The palette color and palette speed parameters may specify basic color palette values (e.g., one of seven types) and palette speeds (or a fixed palette with no switching between palettes). The "program ramp" parameter may specify a point to the portable game machine 12 program data for uploading from the video game machine 14 to the portable game machine 12, and the "length" may specify the number of bytes of data to upload. In the exemplary embodiment, these parameters may reflect the starting address of the work RAM within the portable game machine 12 and a maximum length given by the capacity of the work RAM. Returned values may include "normal", "invalid argument", "portable game machine not connected", or "portable game machine can not be initialized or transfer has failed."

In order for the "Boot" function to succeed, the portable game machine 12 must already be in the "download mode." If the portable game machine 12 is not in the "download mode" (for example if the portable game machine has already been started from a previous "boot"), then it is possible to issue a "reboot" command on the portable game machine 12 (e.g., via the issuance of a "Reset" command from the video game machine 14 to the portable game machine 12), in order to automatically change the mode of the portable game machine to the "download mode" so another upload can proceed. This allows for example, a succession of appropriately-sized modules, blocks or other divisions of a longer program to be successively loaded into the portable game machine with a "reboot" performed after each new download in order to cause the portable game machine to begin executing the newly downloaded code.

In the exemplary embodiment, there may be some timing issues surrounding the performance of a "Boot" function. In particular, in the exemplary embodiment, the communications mode of the portable game machine 12's expansion port may change periodically in order to enable programs to be downloaded in ways other than via the "JOY BUS" protocol. Thus, a particular window of time may exist within this overall cycling when it is possible to perform a "Boot" function. To get around this issue, the video game machine 14 may continually issue the function at different times until it succeeds. The issuance of repeated "Boot" calls should be appropriately timed to fall within the timing window defined by the portable game machine 12's bus cycling.

GetProcessStatus

In the illustrative embodiment, the GetProcessStatus command is used to allow the video game machine 14 to get the processing status function of the portable game machine 12.

Parameters may include the address of a controller channel for the function that is currently processing, and a pointer to a value holding the effective percentage of completion of current processing for cases where the "boot" function is still processing or has just finished processing.

Hints for Programming an Example Portable Game Machine Application

In the example embodiment, when the portable game machine 12 is powered on, the serial device (port) enters the "JOY BUS" mode and authentication is performed as described above. Authentication may be performed based on the condition that a specific cartridge is inserted into the portable game machine 12 as a condition for executing the "boot" from the video game machine 14. A "boot" startup address may be fixed to a predetermined address. A "reboot" function as described above that is resident in the portable game machine 12 may be used for performing a reboot on an as-needed basis with no required operation on the part of the user (e.g., automatically in response to commands received from the video game machine 14). In the example embodiment, it is desirable to keep the portable game machine 12's interrupt response processing time in mind when designing a common application for the video game machine 14 and the portable game machine 12. This will result in higher speed data transfers (e.g., continuous transfers).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A game system comprising:
    a portable game machine adapted for receiving an information storage medium in receiving portion thereof, and further including readable/writable storage, said portable game machine selecting between (a) process to start, in response to application of power, execute code stored in said information storage medium when said information storage medium is received by said receiving portion, and (b) a process to request another game machine to transfer executable code thereto for execution when said information storage medium is not received in said receiving portion;
    said another game machine removably receiving a further information storage medium storing further code and reading the further code out of the further information storage medium and transferring said further code to said portable game machine;
    wherein said portable game machine writes the further code transferred thereto from said another game machine into said readable/writable storage, and executes the further code written in said readable/writable storage.

2. The game system of claim 1, wherein said further information storage medium further stores a download program to be executed by said portable game machine for, in use, downloading said further code to said portable game machine.

3. The game system of claim 2, wherein said further code stored in said further information storage medium is too large to be stored all at once within said readable/writable storage, and
    said download program downloads said further code in the form of modules or blocks smaller than the storage capacity of said readable/writable storage.

4. A game system, structured by communicatably connecting at least one portable game machine that can receive a first information storage medium and another game machine that can receive a second information storage medium,
    said portable game machine comprising
        a first receiver for removably receiving said first information storage medium storing a program to be executed on a portable game machine;
        a first communication port communicatably connecting to said other game machine;
        program storage storing a startup program to be executed at startup;
        readable/writable storage readably/writably storing an auxiliary program transferred from said other game machine; and
        a first processor executing said startup program stored in said program storage in response to startup, to start execution of the first information storing medium program according to said startup program when the first information storage medium is received by said first receiver, and forwarding a transfer request command through said first communication port according to said startup program thereby storing in said readable/writable storage said auxiliary program transferred from said other game machine and executing said auxiliary program when the first information storage medium is not received by said first receiver and said other game machine is communicatably connected to said first communication port;
    said second information storage medium storing at least said auxiliary program to, in use, be executed on said portable game machine and a providing program to be executed on said other game machine in order to provide said auxiliary program to said portable game machine;
    a second receiver for removably receiving said second information storage medium;
    a second communication port for communicatably connecting with said portable game machine first port; and
    second processor executing said providing program of said second information storage medium loaded on said second receiving means in response to receiving a transfer request command from said portable game machine through said second communication port, and transferring said auxiliary program to said portable game machine through said second communication port according to said providing program.

5. The game system of claim 4, wherein said second information storage medium further stores a game program to be executed on said portable game machine,
    said providing program transferring said auxiliary program prior to transfer of said game program to said portable game machine.

6. The game system of claim 5, wherein said auxiliary program is processed to download said game program from said other game machine communicatably connected through said first and second communication ports.

7. The game system of claim 4, wherein said auxiliary program is processed to display a message in a predetermined language on said portable game machine.

8. The game system of claim 4, wherein said auxiliary program is processed to output effect sound or a sound message from said portable game machine.

9. The game system of claim 4, wherein said auxiliary program is processed to provide operational information to a player who operates said portable game machine.

10. A portable game machine having a display, and user-manipulable controls, said portable game machine, in use, receiving a game information storage medium storing a game program to display a game environment on said display means by executing a game program provided by the game information storage medium so that a player can move a character appearing in the game environment by operating the user manipulable controls to thereby play a game, comprising:

a receiver receiving said game information storage medium;

a communication port for communicatably connecting to another game machine;

a startup program store storing a startup program to be executed in response to an initialization event;

a processor executing said startup program stored in said startup program store in response to said initialization event and executing a further program designated by said startup program; and a readable/writable store readably/writably storing an auxiliary program transferred through said communication port;

whereby said startup program causes said processor to execute of a game program provided by said game information storage medium when said game information storage medium is received by said receiver, and forwarding to said other game machine a transfer request command requesting for transfer of said auxiliary program to thereby store in said readable/writable store the auxiliary program transferred through said communication port and executing the auxiliary program.

11. The portable game machine of claim 10 wherein the initialization event comprises power on.

12. A portable handheld computing device comprising:

a housing capable of being operated while being held in and supported by the hand, the housing adapted to receive an interchangeable memory cartridge;

a graphical liquid crystal display disposed on said housing;

a processor disposed within said housing and coupled to control the graphical information displayed on said display;

a communications port coupled to said processor; and a boot ROM disposed within said housing and coupled to said processor, the boot ROM including a routine for execution by said processor that allows the processor to receive and execute code blocks when no memory cartridge is received by said housing.

13. A portable handheld computing machine as in claim 12 wherein said boot ROM includes a reboot routine for execution by said processor, said reboot routine being performed repeatedly to allow the portable game machine to receive multiple successive downloads of code for execution.

14. The portable handheld computing machine as in claim 12 wherein the routine allows the portable computing machine to receive a succession of appropriately sized blocks of executable code to be successively downloaded into and executed by the portable game machine.

15. The portable handheld computing machine as in claim 12 wherein the processor includes a graphics engine that efficiently performs 2D video game display functions.

16. A method of playing a video game comprising:

linking first and second portable handheld video game machines together with a communications link;

inserting a memory cartridge into said first portable handheld video game machines;

conditioning the second portable handheld video game machines to begin operating in a download mode;

downloading executable code from the first game machine into the second game machine; and executing the downloaded code with the second game machine to provide a multiplayer playing opportunity allowing first and second players respectively operating the first and second portable game machines to play an interactive multiplayer game together.

17. The method of claim 16 wherein the conditioning step comprises activating power to the second game machine.

18. The method of claim 16 wherein the conditioning step comprises manipulating controls of the second game machine in a predetermined fashion.

19. The method of claim 16 wherein the second game machine has no memory cartridge inserted therein.

20. The method of claim 16 wherein the conditioning step is performed by the first game machine sending a command to the second game machine over the link.

* * * * *